H. M. SPECHT.
VEHICLE WHEEL.
APPLICATION FILED MAY 28, 1907.
907,906.
Patented Dec. 29, 1908.
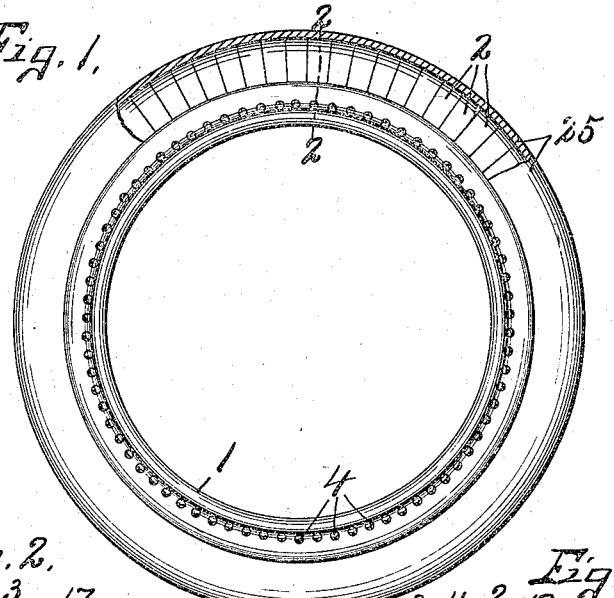
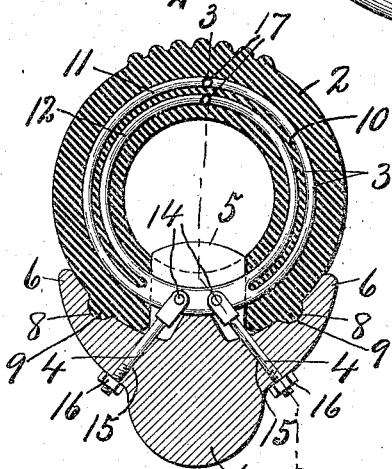
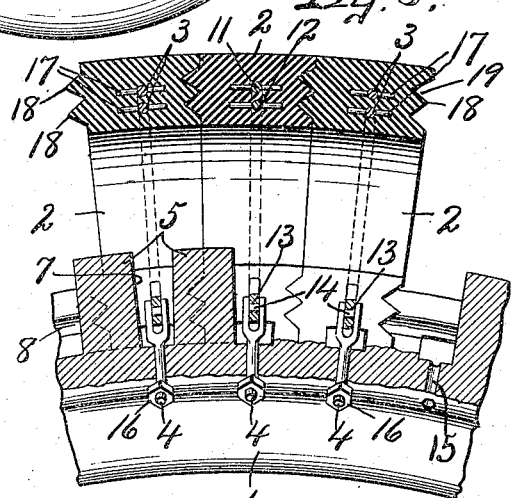
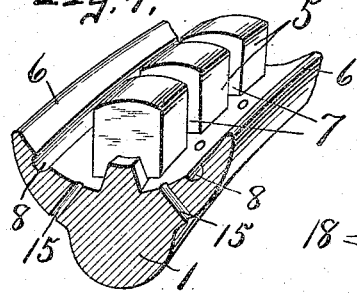
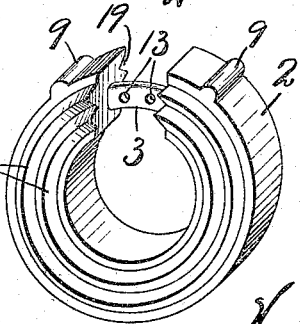
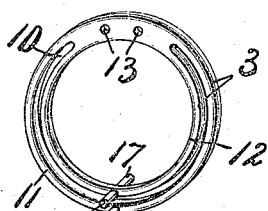
Witnesses.
Inventor.
H. M. Specht
By.
Howard P. Denison
Attorney.

UNITED STATES PATENT OFFICE.

HARRY MORTIMER SPECHT, OF SKANEATELES, NEW YORK.

VEHICLE-WHEEL.

No. 907,906.   Specification of Letters Patent.   Patented Dec. 29, 1908.

Application filed May 28, 1907. Serial No. 376,134.

*To all whom it may concern:*

Be it known that I, HARRY MORTIMER SPECHT, of Skaneateles, in the county of Onondaga, in the State of New York, have invented new and useful Improvements in Vehicle-Wheels, of which the following, taken in connection with the accompanying drawings, is a full, clear, and exact description.

This invention relates to certain improvements in vehicle wheels and refers more particularly to the tire, and means for securing it to the rim.

My object is to provide a puncture-proof, and practically indestructible tire which is specially adapted for self-propelled vehicle wheels and bicycles, as a substitute for the usual pneumatic tire, but which has all the resiliency and other advantages of the pneumatic tire, together with the additional advantage that it is made up of lamina, any one of which may be removed and replaced when worn, or otherwise rendered unfit for use without interfering with the other sections.

In other words, I have sought to produce a laminated tire having all the resiliency of the ordinary pneumatic tire and composed of a circular series of spring metal rings embedded or incorporated in some durable flexible material, as rubber, whereby the greater portions of the metal rings are concealed and protected from the elements.

A further object is to provide separate fastening means for each of the tire sections or lamina adapted to be secured to the rim of the wheel in such manner that they may be released at any time to permit the removal of any one or more rings or tire sections separately from the others.

A still further object is to provide the meeting edges of the rings with interfitting tongues and grooves whereby a certain degree of continuity is established between the sections or rings so that the resilient action of any one of the rings is transmitted more or less to the next adjacent rings.

Other objects and uses will appear in the following description.

In the drawings—Figure 1 is a side elevation of a wheel rim and my improved tire applied thereto. Figs. 2 and 3 are enlarged sectional views taken respectively on lines 2—2, Fig. 1, and 3—3, Fig. 2. Figs. 4, 5, and 6 are perspective views respectively of a portion of the rim; one of the tire sections and one of the spring metal rings inclosed within the tire section.

This wheel comprises essentially a rim —1— and a laminated tire composed of a circular series of rings —2— of rubber or other flexible material, each having embedded or incorporated therein a spring metal ring —3— which is adapted to be secured to the rim —1— by suitable fastening means, as clamping bolts —4—.

The rim —1— may be of any suitable material, such as wood or metal, and in this particular instance, is provided with a central lengthwise rib —5— and opposite lateral projecting flanges —6—, the rib —5— being formed with a series of radial slots —7— corresponding in number to the number of tire sections —2— for receiving portions of the metal rings —3— and holding the lamina in fixed relation to each other and to the rim —1—, said slots being open at the periphery to permit the removal or replacement of any one or more of the tire sections separately from the others.

The flanges —6— are formed in their peripheries with lengthwise grooves —8— and the rings —2— are formed upon their peripheries with correspondingly positioned transverse ribs —9—, which enter said grooves when the rings are placed upon the rim to hold said rings against lateral or transverse displacement, it being understood that the transverse contour of the periphery of the flanges —6— is substantially the same as the adjacent portions of the rings which are seated thereon.

The rubber sections —2— of the tire rings are divided through one side and their meeting ends are spread or separated a distance corresponding to the transverse width of the flange —5— of the rim —1— so as to abut against the opposite side faces of said flange when assembled upon the rim.

The spring metal rings —3— are continuous, and the greater portion thereof are embedded and concealed within the rubber ring section —2—, except that portion which is exposed between the meeting ends of the rubber section —2—, this latter portion being preferably solid, while the remaining portions inclosed within the rubber section —2— are formed with a circular slot or opening —10— therethrough from side to side, forming outer and inner spring segments —11— and 12—, which are spaced apart by the slot —10—, and are preferably round in cross section, the outer ring segment —11— affording a certain degree of resiliency and resistance while the inner ring segment 12— affords additional resilient resistance and acts as a spring buffer for the outer ring segment —11— when the compression load upon the tire is excessive. This is an important feature of my invention for the reason that the tire is extremely resilient under a light load, and at the same time the resistance to compression gradually increases under increasing heavy loads.

The solid portion of the spring metal ring —3— exposed between the meeting ends of the rubber section —2—, and which is fitted in its corresponding slot —7— in the rib —5— affords a means of attachment for the clamping bolts —4—, and for this purpose is provided with transverse apertures 13— for receiving pivotal pins 14— on the inner ends of the opposite clamping bolts —4—, the latter being passed through diverging apertures 15— in the rim —1— and are tightened by clamping nuts 16— which engage the inner face of said rim.

The spring metal rings —3— are held against relative circumferential movement within their inclosing rubber rings —2— by lateral projections 17— which are secured to the ring and are likewise embedded and concealed in the rubber rings —2—, thereby holding the solid portion of the spring ring —3— in exact registration with the space between the meeting ends of the rubber ring, although the clamping-bolts —4— serve a similar purpose when the tire sections are secured to the rim. The opposite meeting faces of the rubber tire sections —2— are formed with annular tongues 18— and grooves —19—, the tongues of each section fitting into the grooves of the adjacent section, thereby establishing a certain degree of continuity between the several tire sections, whereby the compression strains on one section are transmitted to a greater or less degree to the adjacent sections, and therefore relieves the individual sections from excessive strains in passing over obstructions and uneven pavements.

In some instances, the laminated tire may be covered with a continuous rubber shoe —25—, shown in Fig. 1, but I do not wish to be limited to the use of this shoe, as the invention lies more particularly in the laminated tire composed of a circular series of rubber rings having internal spring metal rings with means for fastening the tire sections to the rim. In placing these tire sections in position upon the rim the bolts —4— are brought into registration with the outer ends of the apertures 15— and the ring is then pressed inwardly or radially, thereby forcing the bolts through said apertures, whereupon they are tightened by the nuts —16— and each tire section is therefore held by separate fastening means, this operation being continued for each tire section, until the entire series are securely fastened to the rim, it being understood that the elasticity of the rubber rings enables them to be compressed when the last section is placed in position so as to afford tight joints between the several sections.

What I claim is:

1. In a vehicle wheel, a transversely slotted rim, a tire comprising a series of rubber rings seated upon the periphery of the rim, each ring having inclosed therein a spring metal ring seated in one of the rim slots, and means for holding the metal rings upon the rim.

2. In a vehicle wheel, a rim having transverse slots, a tire comprising a series of rubber rings arranged side by side around and upon the periphery of the rim, each rubber ring having inclosed therein a metal spring ring, said rubber rings having interfitting V-shape tongues and grooves on their meeting faces, and fastening devices for the metal rings.

3. In a vehicle wheel, a rim, a tire comprising a series of spring metal rings mounted side by side upon the periphery of the rim, each spring ring having a circular slot dividing it into inner and outer spring sections which are united to each other at their junction with the rim, and are secured to said rim and separate rubber rings inclosing the greater portions of the metal rings.

In witness whereof I have hereunto set my hand this 21st day of May, 1907.

HARRY MORTIMER SPECHT.

Witnesses:
  EDWARD C. MILLER,
  J. HORATIO EARLE.